(12) United States Patent
Soppitt et al.

(10) Patent No.: US 10,699,272 B2
(45) Date of Patent: Jun. 30, 2020

(54) CUSTOMIZED CONTENT INTEGRATION IN MOBILE DEVICE APPLICATION

(71) Applicant: VISA INTERNATIONAL SERVICE ASSOCIATION, San Francisco, CA (US)

(72) Inventors: Benjamin James Josep Soppitt, Foster City, CA (US); Michael Lemberger, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 655 days.

(21) Appl. No.: 15/349,892

(22) Filed: Nov. 11, 2016

(65) Prior Publication Data
US 2018/0137505 A1 May 17, 2018

(51) Int. Cl.
| | |
|---|---|
| G06Q 20/40 | (2012.01) |
| G06Q 20/32 | (2012.01) |
| H04L 29/06 | (2006.01) |
| H04W 4/00 | (2018.01) |
| H04W 4/02 | (2018.01) |
| G06F 40/186 | (2020.01) |
| G06F 9/451 | (2018.01) |
| H04W 12/06 | (2009.01) |

(52) U.S. Cl.
CPC ............ *G06Q 20/40* (2013.01); *G06F 9/451* (2018.02); *G06F 40/186* (2020.01); *G06Q 20/32* (2013.01); *G06Q 20/322* (2013.01); *H04L 63/08* (2013.01); *H04L 63/083* (2013.01); *H04L 63/0823* (2013.01); *H04L 63/102* (2013.01); *H04W 4/00* (2013.01); *H04W 4/02* (2013.01); *H04W 12/06* (2013.01)

(58) Field of Classification Search
CPC ... G06Q 20/405; G06Q 20/40; G06Q 20/4016
USPC .......................................................... 705/44
See application file for complete search history.

(56) References Cited

U.S. PATENT DOCUMENTS

| | | | |
|---|---|---|---|
| 7,640,306 B2 | 12/2009 | Appelman | |
| 8,270,330 B1 | 9/2012 | Olding | |
| 8,271,334 B1 | 9/2012 | Funk | |
| 8,326,266 B2 | 12/2012 | Smeets | |
| 8,626,659 B1 | 1/2014 | Bowman | |
| 8,645,971 B2 | 2/2014 | Carlson | |
| 9,269,086 B2 | 2/2016 | Hurry | |
| 2004/0051726 A1* | 3/2004 | Martyn | G06F 3/0482 715/700 |
| 2010/0299208 A1* | 11/2010 | Carlson | G06Q 20/32 705/14.64 |

(Continued)

*Primary Examiner* — Hai Tran
(74) *Attorney, Agent, or Firm* — Kilpatrick Townsend & Stockton LLP

(57) ABSTRACT

Described herein is a system in which content presented in a graphic user interface (GUI) of a mobile application may be customized based on user information. In some embodiments, a mobile application server providing backend support for the mobile application executed on a mobile device may provide notification templates populated with account-specific data to the mobile device. In some embodiments, the notification templates may be populated by an authorization server based on account-specific information. In some embodiments, the notification templates may be populated by the mobile application server based on account-specific information provided to it by an authorization server.

20 Claims, 6 Drawing Sheets

(56) References Cited

U.S. PATENT DOCUMENTS

2012/0131683 A1\* 5/2012 Nassar .................... H04L 63/08
   726/28
2014/0082567 A1\* 3/2014 Martyn ................. G06F 3/0482
   715/841

\* cited by examiner

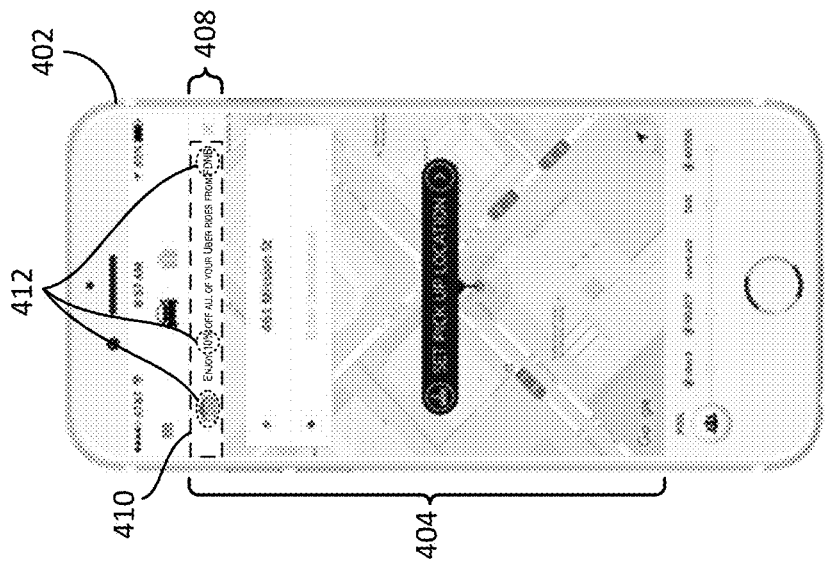
FIG. 4B
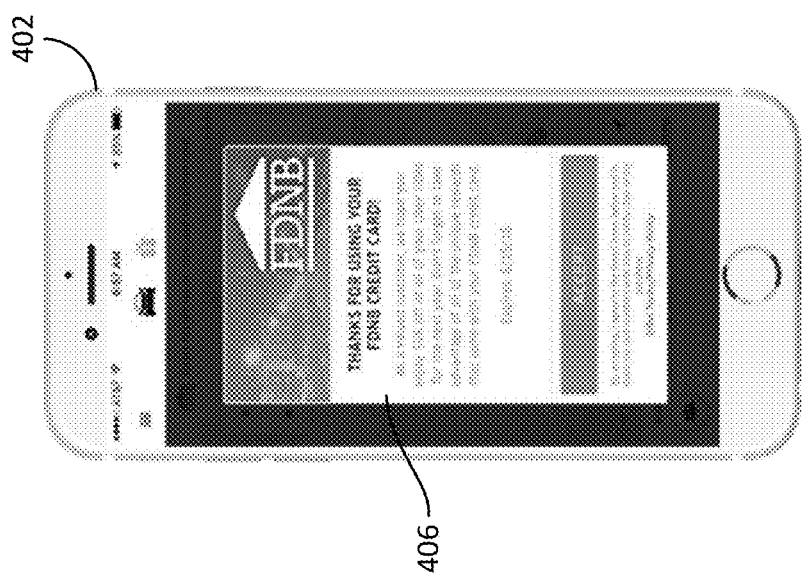
FIG. 4A
FIG. 4

CUSTOMIZED CONTENT INTEGRATION IN MOBILE DEVICE APPLICATION

BACKGROUND

Conventional advertising on computer networks generally involves the use of banner ads on Websites. Advertisements can be provided to a host site operator. When a user accesses the host site, the host site operator may display those ads on the host site. If a user selects the ad, then the host site operator may obtain a fee.

While such conventional advertising schemes are useful, a number of problems exist. For example, such conventional advertisements are not targeted to a specific user, so the ads are not as effective as ads that are specifically targeted to a user. Further, in addition to not being user specific, such ads may not be timely. Ads may be provided to a host site, but purchasing preferences or pricing may change over time. As a result, such ads may not reflect the current intent of the ad provider.

Embodiments of the invention address these and other problems, individually and collectively.

BRIEF SUMMARY

Embodiments of the disclosure are directed to a system in which content presented in a graphic user interface (GUI) of a mobile application may be customized based on user information. The system enables a mobile application developer to reserve portions of the GUI for content provided by an authorization server. To do this, the mobile application server providing backend support for the mobile application on a mobile device may provide notification templates populated with account-specific data to the mobile device. In some embodiments, the notification templates may be populated by an authorization server based on account-specific information. In some embodiments, the notification templates may be populated by the mobile application server based on account-specific information provided to it by an authorization server.

One embodiment of the invention is directed to a method of providing customized content to a user of a mobile application, comprising receiving, from a mobile application, an indication of an access credential and an identifier for the mobile application, identifying an authorization computer associated with the access credential, identifying a notification template based at least in part on the access credential and the identifier for the mobile application, requesting account-specific information relevant to the identified notification template, wherein the authorization computer identifies an account associated with the access credential and determines the account-specific information based on the account, upon receiving the account-specific information, populating the notification template with the account-specific information, and providing the populated notification template to the mobile application such that the populated notification template is presented to a user of the mobile application.

Another embodiment of the invention is directed to a server apparatus comprising a processor and a memory including instructions that, when executed with the processor, cause the server apparatus to receive, from a mobile application, an indication of an access credential and an identifier for the mobile application, identify an authorization computer associated with the access credential, identify a notification template based at least in part on the access credential and the identifier for the mobile application, and request, from the authorization computer, account-specific information relevant to the identified notification template, wherein the authorization computer identifies an account associated with the access credential and determines the account-specific information based on the account. The instructions may further cause the server apparatus to, upon receiving the account-specific information, populate the notification template with the account-specific information, and provide the populated notification template to the mobile application such that the populated notification template is presented to a user of the mobile application.

Another embodiment of the invention is directed to a mobile application server apparatus comprising a processor and a memory including instructions that, when executed with the processor, cause the mobile application server apparatus to receive, from a mobile device executing a mobile application supported by the server apparatus, an indication of an access credential to be used in at least one transaction, identify at least one notification template associated with a reserved space in a graphical user interface of the mobile application, determine a number of data fields to be populated with account-specific information, and route a request for the account-specific information. The instructions may further cause the server apparatus to, upon receiving the account-specific information, populate the number of data fields of the at least one notification template and provide the at least one notification template to the mobile device.

By way of illustrative example, a user of a mobile application may enter, via a GUI, a credit card number or other payment device to be used in conjunction with the mobile application. Upon receiving this payment device, the mobile application may store it for future reference and may subsequently contact an issuer of the payment device (e.g., via a processing network). The issuer may be provided with a number of notification templates associated with the mobile application that indicate locations and/or types of spaces available on the GUI for customized content. In this illustrative example, the issuer may identify content that is appropriate for each of the locations and types of spaces on the GUI. The content may be account-specific (e.g., specific to a particular user) and may include offers or visual enhancements related to that account. By way of particular example, the issuer may identify a discount that the user is eligible to receive when using the mobile application. Furthermore, the amount of the discount that the user is eligible to receive may be dependent on a credit rating or status of the user with the issuer. Once the discount is determined, the issuer may populate a notification template with instructions to present the discount offer to the user in an appropriate space on the GUI.

These and other embodiments of the invention are described in further detail below.

BRIEF DESCRIPTION OF THE DRAWINGS

FIGS. 4A and 4B depict a first set of illustrative examples in which populated notification templates may be presented in accordance with embodiments of the disclosure;

DETAILED DESCRIPTION

Figure 1:
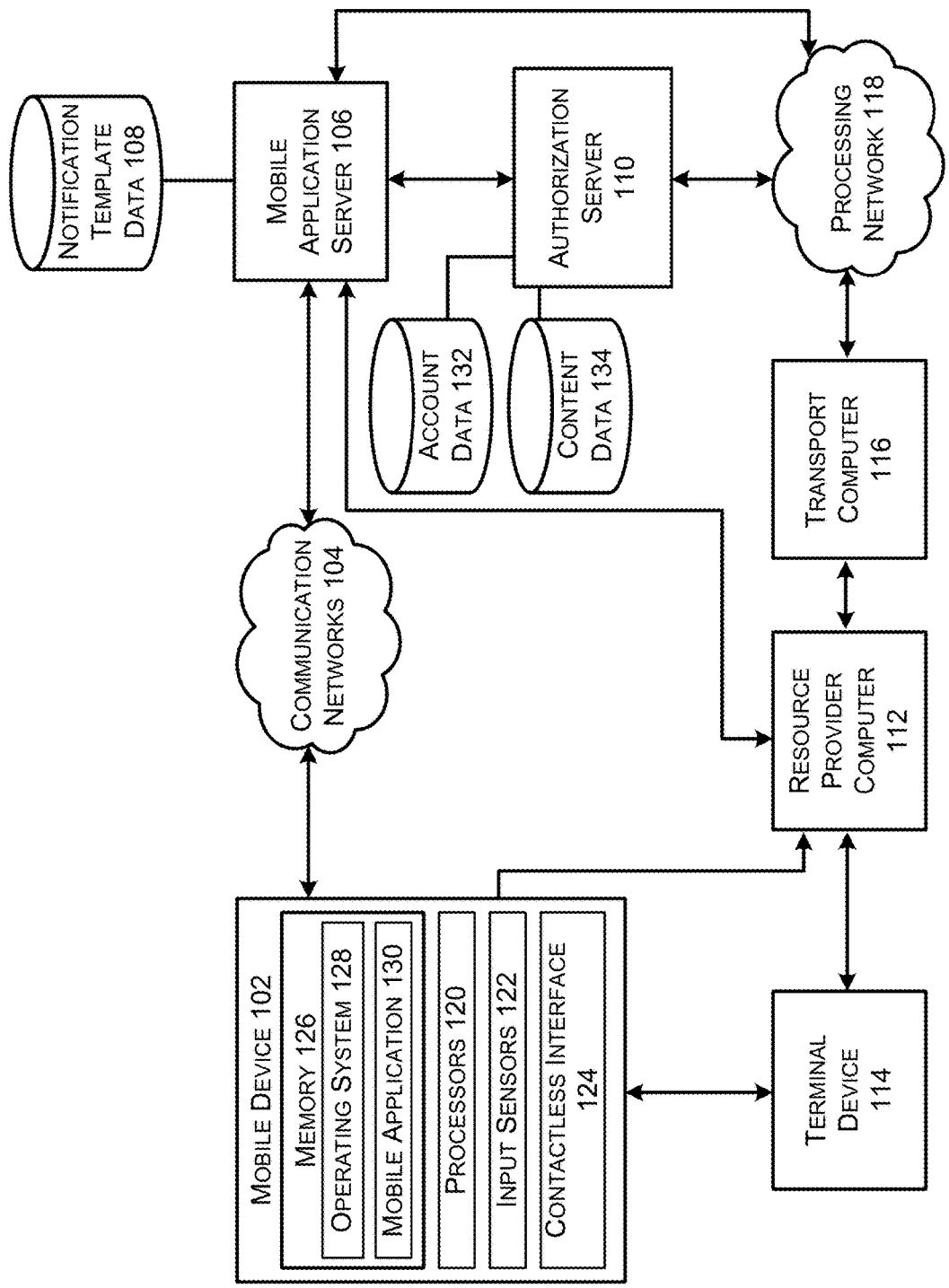
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "access credential" may be any data or portion of data used to gain access to a particular resource. In some embodiments, an access credential may be a login and/or password for a user account. In some embodiments, an access credential may comprise a payment device, such as a credit card number. In some embodiments, an access credential may include account information or a token associated with the account information, a cryptogram, a digital certificate, etc. A mobile device may store one or more access credentials associated with each mobile application. In some embodiments, an access credential stored in association with a mobile application may be used to conduct transactions on behalf of a user of the mobile application. In some embodiments, the mobile device may store a single access credential that may be used in each transaction initiated by the mobile device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

An "identifier" may include any suitable distinctive set of characters used to identify an object (e.g., an electronic device). An exemplary device identifier may include any suitable number or type of characters (e.g., numbers, graphics, symbols, or other information) that may uniquely represent the object. By way of example, an identifier may be a serial number, partial serial number, or a name or nickname. In some embodiments, an identifier may indicate a particular mobile application server from which a request originated. In this example, the identifier may be provided to an authorization server in order to enable the authorization server to identify an appropriate set of notification templates.

An "issuer" may typically refer to a business entity (e.g., a bank) that maintains an account for a user associated with an access credential. An issuer may be a type of authorization server, and may have a primary purpose of authorizing transactions that use an access credential maintained by the issuer.

A "mobile application" may be and set of computer executable instructions installed on, and executed from, a mobile device. Mobile applications may be installed on a mobile device by a manufacturer of the mobile device or another entity. In some embodiments, the mobile application may cause a mobile device to establish a communication session with a mobile application server that provides back-end support for the mobile application. A mobile application server may maintain account information associated with a particular mobile device and/or user. In some embodiments, a user may be required to log into a mobile application in order to access functionality provided by the mobile application.

A "mobile device" may be any suitable device that is transportable. In some embodiments, an electronic device is capable of establishing a communication session with another electronic device (e.g., an application server) and transmitting/receiving data from that device. A mobile device may include the ability to download and/or execute mobile applications. Mobile devices may include mobile communication devices as well as personal computers and thin-client devices. In some embodiments, a mobile device may comprise any portable electronic device that has a primary function related to communication. For example, a mobile device may be a smart phone, a personal data assistant (PDA), or any other suitable handheld device.

A "notification template" may be a message in which customized content may be placed. A notification template may include an indication of content to be presented as well as a manner in which that content is to be presented. In some embodiments, a notification template may include at least a portion of text as well as at least some data fields that may be populated with information specific to a mobile application or an account. In some embodiments, a notification template may include computer executable instructions that cause a mobile device executing a mobile application to perform one or more actions related to the content included in the notification template. In its simplest form, a notification template may comprise a portion of text with at least one input field.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first entity requesting resources from a second entity. In this example, the transaction is completed when the resources are either provided to the first entity or the transaction is declined.

Details of some embodiments of the present invention will now be described.

FIG. 1 depicts an example system architecture 100 capable of implementing at least some embodiments of the current disclosure. In FIG. 1, a mobile device 102 is depicted as being in communication, via one or more communication networks 104, with a mobile application server 106. The mobile application server 106 may have access to notification template data 108 and/or an authorization server 110. Additionally, the mobile device 102 may be in communication with a resource provider computer 112. In some embodiments, the mobile device 102 may be used to conduct a transaction via a terminal device 114. Upon receiving an indication that a transaction is to be conducted, the terminal device 114 may transmit an authorization request message to a transport computer 116, which may in turn forward the authorization request message to the authorization server 110 via a processing network 118 for authorization. The authorization server 110 may authorize or decline the transaction based on one or more factors associated with the transaction. In some embodiments, the authorization server 110 may base this decision, at least partially, on a confidence level associated with the transaction.

The mobile device 102 may be any type of portable communication device such as, but not limited to, a mobile phone, a smart phone, a personal digital assistant (PDA), a laptop computer, a tablet PC, etc. Additionally or alternatively, the mobile device 102 may be any type of wearable technology device, such as a watch, earpiece, glasses, etc. It may also be an automobile with remote communication capabilities.

The mobile device 102 may include one or more processors 120 capable of processing user input. The mobile device 102 may also include one or more input sensors 122 for receiving user and/or environmental input. There may be a variety of input sensors 122 capable of detecting user or environmental input, such as a keyboard, a mouse or pointer device, accelerometer, camera, microphone, satellite positioning system receiver (e.g., GPS receiver), etc. In some embodiments, the mobile device 102 may include a contactless interface 124 configured to enable communication between the mobile device 102 and terminal device 114. Examples of contactless interface 124 may include one or more radio frequency (RF) transceivers configured to send and receive communications using near-field communications (NFC), or other radio frequency or wireless communication protocols such as Bluetooth, Bluetooth low-energy (BLE), Wi-Fi, iBeacon, etc. In some embodiments, contactless interface 124 may include an optical interface (e.g., a display screen) to present payment information in the form of an image such as a quick response (QR) code, or other machine readable code to the terminal device 114 in embodiments in which the terminal device 114 includes an optical code scanner or reader. Embodiments of one or more modules on the mobile device 102 may be stored and executed from its memory 126.

Turning to the contents of the memory 126 in more detail, the memory 126 may include an operating system 128 and one or more modules configured to cause the processors 120 to carry out instructions in accordance with at least some embodiments. For example, the memory 126 may include a mobile application 130 configured to work with the processor 120 to communicate transaction data (e.g., token and/or other account information) to terminal device 114 in order to complete a transaction. In addition, the mobile application may be configured to convey location data for the mobile device 102, and provide location data, for example, to the terminal device 114 to conduct the transaction.

In some embodiments, the mobile application 130 may comprise code, that, when executed by the processor 120, is configured to perform a primary function, which may be unrelated to this disclosure. However, in addition to the primary function, the mobile application 130 may also comprise code, that, when executed by the processor 120, is configured to present one or more pieces of customized data. For example, the mobile application 130 may comprise code executable by the processor 120 to present content provided to the mobile device in a notification template. In some embodiments, a graphical user interface (GUI) for the mobile application 130 may have assigned portions of the interface that may be replaced with content provided in a notification template. In some embodiments, the mobile application 130 may also include default content to be presented in the absence of a customized notification template.

In some examples, the communication network 104 and/or the processing network 118 may include any one or a combination of many different types of networks, such as cable networks, the Internet, wireless networks, cellular networks, and other private and/or public networks. In addition, the communication network 104 and/or processing network 118 may comprise multiple different networks. For example, the mobile device 102 may utilize a wireless local area network (WLAN) to communicate with a wireless router, which may then route the communication over a public network (e.g., the Internet) to the mobile application server 106. In some embodiments, the processing network 118 may be an electronic payment network (e.g., VisaNet).

Mobile application server 106 may be any computing device or plurality of computing devices configured to provide backend support for the mobile application 130. In some embodiments, the mobile application server 106 may be configured to perform one or more calculations on behalf of the mobile application 130 stored on, and executed from, the mobile device 102. In some embodiments, the mobile application 130 may be in periodic communication with the mobile application server 106. For example, the mobile application 130 may receive updates or other instructions from the mobile application server 106. In some embodiments, the mobile application 130 and mobile application server 106 may utilize a proprietary encryption and/or decryption scheme to secure communications between the two.

Authorization server 110 may be any computing device or plurality of computing devices configured to receive an authorization request message for a transaction, authorize or decline the transaction, and provide an authorization response message based on whether the transaction has been authorized or declined. In some embodiments, the authorization server 110 may be configured to determine, based on location information provided at the time of the request for the dynamic data and location information provided at the time of a transaction, a confidence level associated with the transaction. The authorization server 110 may determine whether to authorize or decline the transaction based on a confidence level associated with the transaction.

A resource provider computer 112 may be any computing device or plurality of computing devices configured to provide a resource to a requesting entity. In some embodiments, the resource provider computer 112 may be associated with, or operated by, a merchant (e.g., an electronic commerce site or physical retail location). For example, the resource provider may maintain a catalog of items and/or services available for purchase. The resource provider computer 112 may also be configured to complete a transaction upon receiving an authorization response message indicating that a transaction has been approved. In some embodiments, the resource provider computer 112 may be affiliated with the mobile application server 106. In some embodiments, the resource provider computer 112 and the mobile application server 106 may be operated by separate entities. In some embodiments, the resource provider computer 112 may be configured to received transaction information from a terminal device 114 (e.g., within a physical retail location). In some embodiments, the resource provider computer 112 may be configured to receive transaction information from the mobile device 102 (e.g., via a network site).

Terminal device 114 may be any computing device or plurality of computing devices configured to complete a transaction. In some embodiments, a terminal device may be a point of sale (POS) device such as a register. In some embodiments, a terminal device 114 may restrict access to a resource or service. In some embodiments, the terminal device 114 may be owned and/or operated by one of the parties to a transaction that the terminal device 114 is configured to complete. In some embodiments, the terminal device 114 may be configured to transmit transaction information to a mobile device 102 and in response, receive information (e.g., account information) from the mobile device 102, which may be forwarded to a transport computer. In some embodiments, the terminal device 114 may be affiliated with an electronic marketplace or a retail entity that maintains an internet presence. A terminal device 114 may support transactions to acquire resources (e.g., goods and/or services). In some embodiments, a user may request a transaction by visiting a website affiliated with the terminal device 114 and selecting one or more items to purchase. The terminal device 114 may be in communication with other devices via a network connection.

Transport computer 116 may be any computing device or plurality of computing devices configured to process transaction information received from the resource provider computer 112 and/or generate an authorization request message to be transmitted to the authorization server 110. An acquirer may operate the transport computer 116. In some embodiments, the transport computer 116 and the authorization server 110 may be the same entity. For example, the authorization server 110 may be configured to receive transaction information from the resource provider computer 112 and authorize or decline the transaction. In some embodiments, the transport computer may be a third party entity (e.g., an entity unaffiliated with either the authorization server 110 or the resource provider computer 112).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
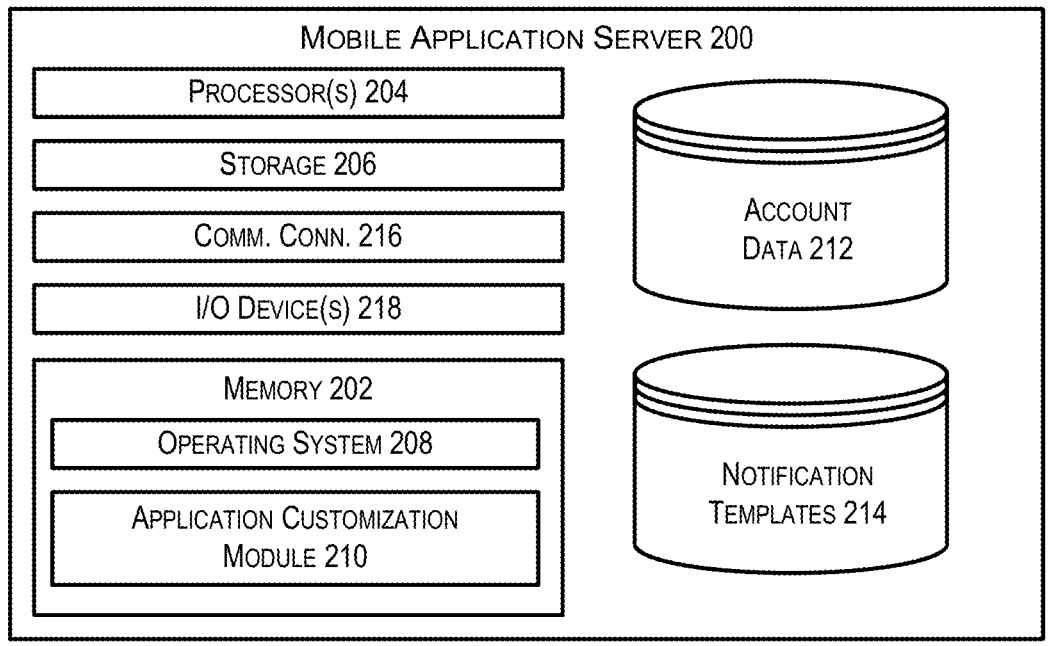
FIG. 2 depicts an example mobile application server configured to provide a mobile application with customized notification templates in accordance with at least some embodiments.

FIG. 2 depicts an example mobile application server 200 configured to provide a mobile application with customized notification templates in accordance with at least some embodiments. The mobile application server 200 may be an example mobile application server 106 of FIG. 1.

The mobile application server 200 may be any type of computing device capable of receiving an electronic record, verifying the electronic record with at least one entity that has signed the electronic record, and obtaining account information from the at least one entity. In at least some embodiments, the mobile application server 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of mobile application server 200, the memory 202 may be volatile (such as random access memory (RAM)) and/or non-volatile (such as read-only memory (ROM), flash memory, etc.). The mobile application server 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the mobile application server 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for customizing information provided to a mobile application (application customization module 210). The memory 202 may also include account data 212, which provides data associated with a user and/or account as well as a repository of notification templates 214, which includes a plurality of notification templates, each of which may be associated with an authorization server and/or a mobile application.

In some embodiments, the application customization module 210 may, in conjunction with the processor 204, be configured to provide populated notification templates to a mobile application installed on, and executed from, a mobile device. In accordance with at least some embodiments, the mobile application server 200 may be in communication with a mobile device via a network connection. Upon receiving access credential information from a mobile application supported by the mobile application server 200 installed on the mobile device, the mobile application server may identify a number of potential notification templates. In some embodiments, each of the notification templates may be associated with a portion of a GUI (e.g., a portion of the interface, a button, or any other suitable element of the GUI) that may be reserved for customized content. The application customization module 210 may, in conjunction with the processor 204, also be configured to request account-specific information from an authorization server, either directly or through a processing network. In some embodiments, the application customization module 210 may cause the potential notification templates to be provided to the authorization server. In these embodiments, the application customization module 210 may receive populated notification templates from the authorization server. In some embodiments, the application customization module 210 may cause the potential notification templates to be populated with information received from the authorization server. Populated notification templates may then be provided by the application customization module 210 to the mobile application on the mobile device via the network connection.

The mobile application server 200 may also contain communications interface(s) 216 that enable the mobile application server 200 to communicate with a stored database, another computing device or server, one or more remote devices, other application servers, and/or any other suitable electronic devices. In some embodiments, the communication interface 216 may enable the mobile application server 200 to communicate with other electronic devices on a network (e.g., on a private network). The mobile application server 200 may also include input/output (I/O) device(s) and/or ports 218, such as for enabling connection with a keyboard, a mouse, a pen, a voice input device, a touch input device, a display, speakers, a printer, etc.

Figure 3:
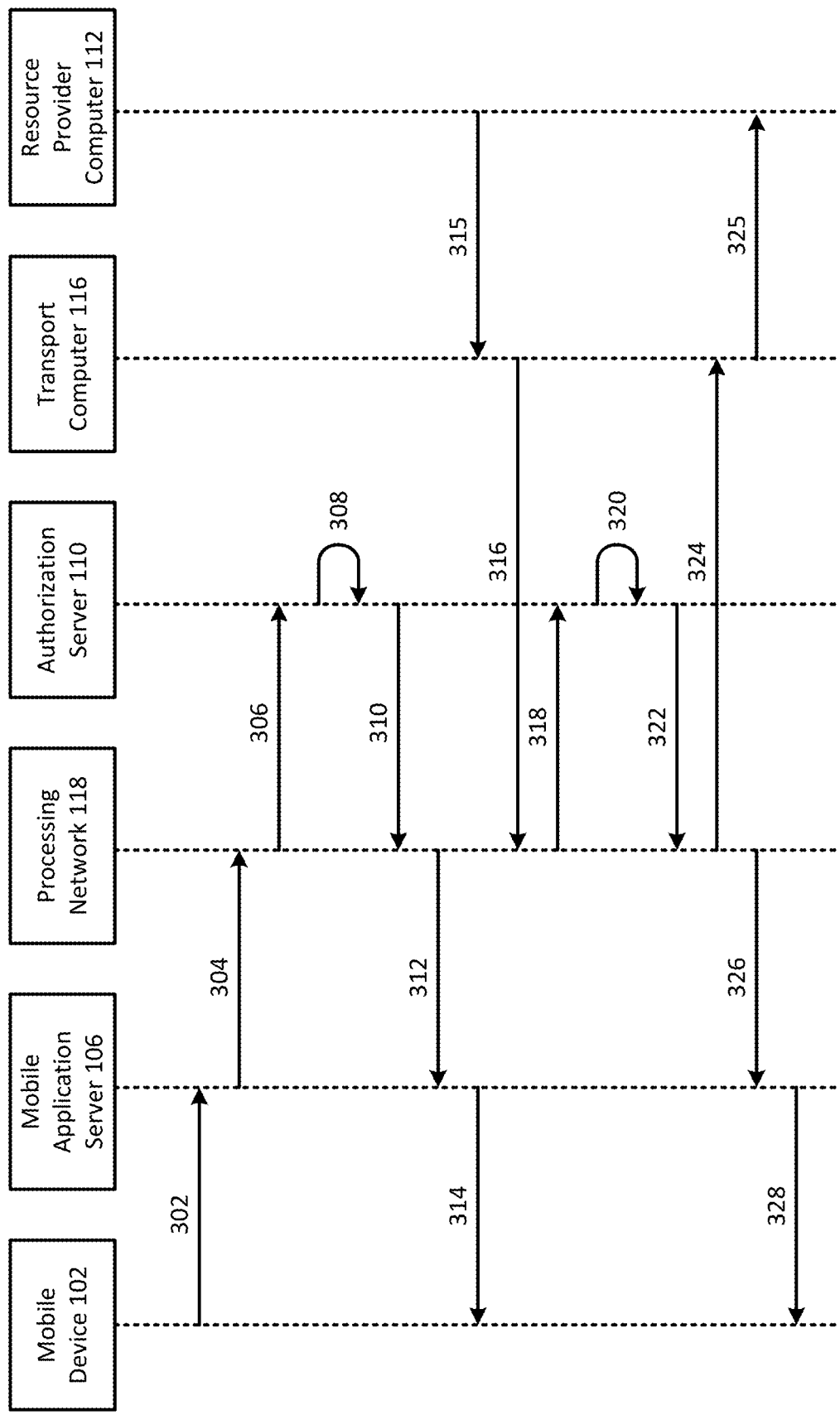
FIG. 3 depicts an illustrative example of processes that may be performed in accordance with at least some embodiments of the disclosure.

FIG. 3 depicts an illustrative example of processes that may be performed in accordance with at least some embodiments of the disclosure. In FIG. 3, a mobile device 102 may be in communication with a mobile application server 106, a processing network 118, an authorization server 110, and a transport computer as described with respect to FIG. 1.

An example process may begin when a mobile device 102 receives an indication of an access credential (e.g., a primary account number for a credit card) to be used in relation to a mobile application. For example, a mobile application may be stored on, and executed from, the memory of a mobile device 102. In this example, the mobile application may receive an indication of an access credential from a user of the mobile device 102 via a graphical user interface (GUI).

Once this indication is received, the mobile application may cause the mobile device 102 to communicate the indication of the access credential to the mobile application server 106 at 302. In some embodiments, an indication of an access credential (e.g., a credit card number, an access badge number, etc.) may include the presence of the access credential or may include a flag or other data (but not the access credential itself) indicating that an access credential was provided to the mobile application.

The mobile application server 106, upon receiving the indication of the access credential from the mobile device 102, may store the indication of the access credential in relation to an account maintained with respect to the mobile device 102. In some embodiments, the mobile application server 106 may identify an authorization entity (e.g., an issuer of a payment card account) associated with the access credential based on a format of the access credential (e.g., a specific string of characters such as a BIN that may indicate a particular authorization entity).

In some embodiments, the mobile application server 106 may identify one or more application-specific notification templates that may be populated with customized information. For example, the mobile application, when executed on the mobile device, may present a GUI with a portion of space reserved for customized content. In this example, the reserved portion of space may be indicated in a notification template, and the mobile application may be configured to present information from a populated notification template within this reserved portion of space. In some embodiments, the notification template may include a size, location, and/or type of the notification that may be presented within the space. The mobile application server 106 may provide one or more identified notification templates to the processing network 118 at 304 along with the indication of the access credential.

The processing network 118 such as a payment processing network, upon receiving the notification templates and/or the indication of the access credential, may identify an appropriate authorization server 110 associated with the access credential. In this regard, the processing network 118 may contain a database which maps access credentials to different authorization servers operated by different authorization entities.

In some cases, the access credentials may be primary account numbers and they may contain BINs (bank identification numbers) that can identify different authorization servers associated with different authorization entities. In some embodiments, the processing network 118 may parse the notification template in order to identify various attributes/data fields that need to be populated into each of the provided notification templates. The processing network 118 may then route a request to the identified authorization server 110 that includes the various attributes/data fields and the indication of the access credential at 306 in a request for account-specific content. The authorization server 110, upon receiving the request, may provide the requested account specific data. In some embodiments, the processing server 118 may forward the received notification templates to the authorization server 110 along with the indication of the access credential at 306 in a request for account-specific content. In some embodiments, the processing network 118 may provide the authorization server 110 with an identifier associated with the mobile application server 106.

In some embodiments, the processing network 118 may be a payment processing network, and may contain transaction data for transactions conducted with multiple merchants using multiple payment devices or accounts issued by multiple issuers. As such, the processing network 118 may contain transaction data that may be more indicative of a user's buying preferences than transaction data held by the authorization server 110. For example, a user may have three credit cards and may conduct transactions with 100 merchants in a month. This transaction data may show a user's preference to shop organic grocery stores rather than regular grocery stores. Such transaction data may be provided to the authorization server 110 when determining what values and/or templates to select and present to the user. In this way, more accurate and targeted offers can be presented to the user than would otherwise be the case using only transaction data stored by a particular authorization server.

In some embodiments, the processing network 118 may, upon receiving the notification templates and/or the indication of the access credential, verify the authenticity of the mobile application server 106. For example, the processing network 118 may verify that the communication originated at an internet protocol (IP) address on a trusted list (a whitelist), the communication did not originate at an IP address on an untrusted list (a blacklist), or that the communication is in compliance with one or more security protocols. In some embodiments, the mobile application server 106 may provide an authentication code to the processing network 118 in order to verify that it is an authorized party. In some embodiments, the communication and/or response may be encrypted using any appropriate encryption technique.

Upon receiving the request for account-specific content from the processing network 118, the authorization server 110 may identify a user associated with the access credential. For example, the access credential may represent an account number or other suitable identifier of a user account. The authorization server 110 may then process the received request at 308. In some embodiments, the authorization server 110 may query a database for values relating to a number of attributes/data fields relevant to the received request. For example, data relating to an attribute might include a specific percentage (e.g., 10%) off of a particular type of transaction conducted with a particular type of merchant using an account associated with the account number. The values may depend upon the particular characteristics of the account and/or the spending history of the user. For example, an account with a platinum status may provide a greater discount than an account with a gold status. In another example, a user's account may show that the user shops frequently at expensive (high end) clothing stores. In some embodiments, the authorization server 110 may also determine a standing or status associated with the account. The authorization server 110 may then determine which values to populate into various attributes/data fields relevant to the request. For example, if the account has a platinum status and likes to use a ride-sharing service called UX, then one or more values indicating a reward of 10% (e.g., in the form of a statement credit) off of a transaction conducted with the merchant UX may be provided in response to the request.

In some embodiments, the authorization server 110 may populate a notification template with the determined values and provide the populated notification template to the processing network 118 at 310. In some embodiments, the authorization server 110 may respond to the request received from the processing network 118 at 310 by providing just one or more requested values without a populated notification template.

In some embodiments, notification templates may be stored on, and managed by, an authorization server 110. For example, the authorization server 110 may maintain a database of notification templates and may identify and populate an appropriate notification template upon receiving a request. In some embodiments, notification templates may be stored on, and managed by, the processing network 118. For example, the processing network 118 may maintain a database of notification templates, may identify an appropriate notification template upon receiving a request, and may subsequently request information from the authorization server 110 to populate the identified notification template. In some embodiments, notification templates stored by either entity may be application specific. For example, the authorization server 110 may receive a number of notification templates specific to a particular mobile application server 106 prior to processing requests. Upon receiving an identifier associated with a mobile application server 106, the entity may identify any notification templates stored in relation to that application server 106. The entity may subsequently populate one or more identified notification templates or may request information with which to populate one or more identified notification templates.

In some embodiments, the processing network 118 may populate a notification template with information provided by the authorization server 110 and provide the populated notification template to the mobile application server 106 at 312. In some embodiments, the processing network 118 may forward an already-populated notification template received from the authorization server 110 to the mobile application server 106 at 312. In some embodiments, the processing network 118 may forward information received from the authorization server 110 to the mobile application server 106 at 312, which may subsequently populate one or more notification templates with the provided information.

In some embodiments, the mobile application server 106 may communicate with the authorization server 110 without routing requests through the processing network 118. For example, the mobile application server 106 may be in communication with the authorization server 110 either directly or indirectly. In this example, the mobile application server 106 may send a request to the authorization server 110 at a specified IP address associated with the authorization server 110.

At 314, the mobile application server 106 may provide one or more populated notification templates to the mobile device 102. The mobile device 102 may, upon execution of the mobile application, display content from the populated notification template in a manner indicated in the notification template. For example, the populated notification template may include an indication of particular information as well as an indication of where/how that information is to be presented. In some embodiments, the notification template may include computer-executable code configured to cause, when executed by a processor, the mobile device to execute an action with respect to the content of the notification template. In some embodiments, the notification template may be provided to the mobile device 102 upon determining that each of the conditions in a set of conditions has been met. For example, a populated notification template may include one or more conditions upon which it is to be presented. In this example, content from the notification template may be presented upon detecting that each of the one or more conditions has been met. By way of illustration, a notification template may include content related to an offer to be presented to a user of the mobile device 102 upon determining that the user has performed some action (e.g., visited a location, conducted a transaction, completed the terms of a different offer, etc.).

In some embodiments, the mobile device 102 may be used to conduct a transaction with a resource provider computer. For this transaction, the user may have interacted with the populated notification template. For example, the populated notification template that is displayed to the user on the mobile device 102 may be for a 10 percent discount on product or service (e.g., transportation in a car to a predetermined location). In some embodiments, the user may select a button or link on the populated notification template to acknowledge his or her acceptance of the offer. A message indicating this acceptance may then be transmitted from the mobile device 102 to the mobile application server 106, the processing network 118, authorization server 110, and/or the resource provider computer 112. In some embodiments, the user need not accept the offer. For example, the authorization server 110 may monitor the user's transactions to identify one or more transactions that are in compliance with terms of the offer. Upon identifying such transactions, the authorization server may apply an offered benefit to the account of the user.

The mobile device 102 may communicate with a resource provider computer 112 (e.g., a merchant computer) in a transaction occurring at a physical location or in an e-commerce setting. Upon receiving information related to the transaction in an authorization request message from the resource provider computer, the transport computer 116 may send the authorization request message to the processing network 118 at 316. The processing network 118, upon receiving the authorization request, may identify the appropriate authorization server 110 and route the authorization request to that authorization server 110 at 318.

Upon receiving the authorization request message, the authorization server 110 may determine whether or not to approve the transaction associated with the authorization request message. The authorization server 110 may respond with an authorization response message indicating whether the transaction is approved or declined. Upon determining that the transaction should be approved, the authorization server 110 may determine whether any of the provided notification templates are associated with the transaction at 320. For example, if the notification template provided to the mobile device 102 at 314 included information on an offer that was extended to the user by the authorization server 110, then the authorization server 110 may determine if one or more conditions associated with the offer have been met. In the event that one or more conditions associated with the offer have been met, the authorization server 110 may be configured to take a predetermined action (e.g., credit the account, etc.). In some embodiments, the authorization server 110 may monitor transactions conducted using the mobile device 102 to identify transactions relevant to the notification templates.

Illustratively, continuing with the above transportation example, the authorization server 110 may have received an indication that the user had accepted the 10 percent discount offer on the next transportation purchase from a particular transportation resource provider. The authorization request message may contain not only the transaction amount for the transaction and a payment account number or payment token, it may also include a merchant identifier such as an MCC (merchant category code). The merchant identifier may be used by the authorization server 110 to conclude that the conditions of the previously provided discount offer have been satisfied. The authorization server 110 may then provide the discount to the user in any suitable form (e.g., a statement credit on the user's account, a deposit in the user's account, etc.)

At a subsequent time, a resource provider computer 112 may transmit a transaction request to the transport computer 116 at 315. Based on the information included in the transaction request, the transport computer 116 may generate an authorization request message to be routed to the authorization server 110 via a processing network at 316 and 318. The authorization server 110 may assess the received authorization request to determine whether to approve the transaction at 320.

Upon determining that the conducted transaction is relevant to the populated notification template, the authorization server 110 may send a notice to the processing network 118 at 322. In some embodiments, the processing network 118 may provide an indication that the user of the mobile device 102 is eligible for a benefit (e.g., a discount) in the current transaction. In this scenario, the notification may be provided to the transport computer 116 at 324, which may subsequently present the notification to the user. In some embodiments, the transport computer 116 may provide a notification to the resource provider computer 112 that the transaction has been approved at 325. In some embodiments, the processing network 118 may forward the notification to the mobile application server 106 at 326, which may subsequently forward the notification to the mobile device 102 at 328. The mobile device 102 may present the notification to the user via the GUI. In this way, a user of the mobile device may be made aware of a provided benefit almost immediately.

FIG. 4 depicts a first illustrative example of customized notification templates that may be presented in accordance with at least some embodiments of the disclosure. In FIG. 4, a mobile device 402 is depicted as executing a mobile application in accordance with embodiments of the disclosure. Upon execution of the mobile application, a GUI 404 may display information relevant to the mobile application. In addition, the mobile application may cause the GUI 404 to display content associated with a number of customized notification templates as described below. FIG. 4 is broken up into FIG. 4A and FIG. 4B, both of which illustrate examples in which notification templates may be presented in accordance with embodiments of the disclosure.

In some embodiments, the notification templates may be customized upon a user entering at least one access credential into the mobile application. For example, the user may enter a credit card number to be used as a payment device in the mobile application. In this example, the issuer associated with the credit card (i.e., the authorization server) may be contacted by the mobile application (via a mobile application server and/or a processing network) in order to request account-specific information from the issuer. This account-specific information may represent any suitable data related to the user, the credit card, and/or the mobile application. In some embodiments, the type of account-specific information provided by the authorization server may be dependent upon particular conditions being met. For example, the types of offers provided to a user may be dependent on his or her status or credit rating with the authorization server.

Notification templates may be customized in a number of ways. For example, a notification template may include a portion of text as well as a number of data fields that may be populated with user-specific and/or mobile-application-specific information. In some embodiments, a notification template may be customized to a user based on a status of that user. For example, all users that provide an access credential associated with a particular authorization server may be eligible for a certain benefit (e.g., a discount) that may be realized by using the access credential and/or mobile application. However, the value of the benefit may be customized based on that user's status. In this example, a user that enters a payment device backed by XYZ Bank may be eligible for a discount when using the mobile application and meeting specified conditions, but the amount of the discount may be depend on the user's status with XYZ Bank. By way of further illustration, a user with a platinum status with XYZ Bank may be eligible for a 12% discount, whereas a user with a gold status with XYZ Bank may be eligible for a 10% discount, and a user with a silver status with XYZ Bank may be eligible for an 8% discount.

In some embodiments, a number of different types of notification templates may be implemented in accordance with the disclosure. In some embodiments, a notification template may cause the mobile application to present a populated notification template 406. The notification template 406 may be presented upon meeting conditions indicated in the notification template. For example, in some embodiments a notification template may indicate that the notification template 406 is to be presented upon initiating the mobile application or upon completing a transaction. In the present case, the notification template 406, which comprises a popup message, is populated with a value which comprises the entirety of the text displayed in the notification template 406. In accordance with embodiments of the disclosure, the text may have been provided by an authorization server upon determining that the text was in compliance with rules associated with the notification template 406 (e.g., character limits, functionality, content restrictions, etc.).

In some embodiments, a notification template may cause a portion of the GUI 408 to display customized content within the application at an indicated location and/or in an indicated way. For example, a portion of the GUI 408 may be reserved for customized content and the mobile application server may store a notification template 410 corresponding to that portion of the GUI 408. As depicted, the notification template 410 may include at least a portion of text and one or more data fields to receive values 412 from an authorization server. In some embodiments, the mobile application server may send the notification template 410 corresponding to the portion of the GUI 408 to the authorization server to be populated with one or more values 412. In some embodiments, the mobile application server may request account-specific information from the authorization server with which to populate the notification template 410 corresponding to the portion of the GUI 408. Once the mobile application server has received a notification template 410 populated with values 412 corresponding to the portion of the GUI 408, the mobile application server may provide that populated notification template 410 to the mobile application running on the mobile device. The mobile application may subsequently display content from the populated notification template 410 within the reserved portion of the GUI 408. In some embodiments, the mobile application may have stored a default notification template, such that in the event that no customized notification template is received, content from the default notification template is presented in the portion of the GUI 408.

Figure 5:
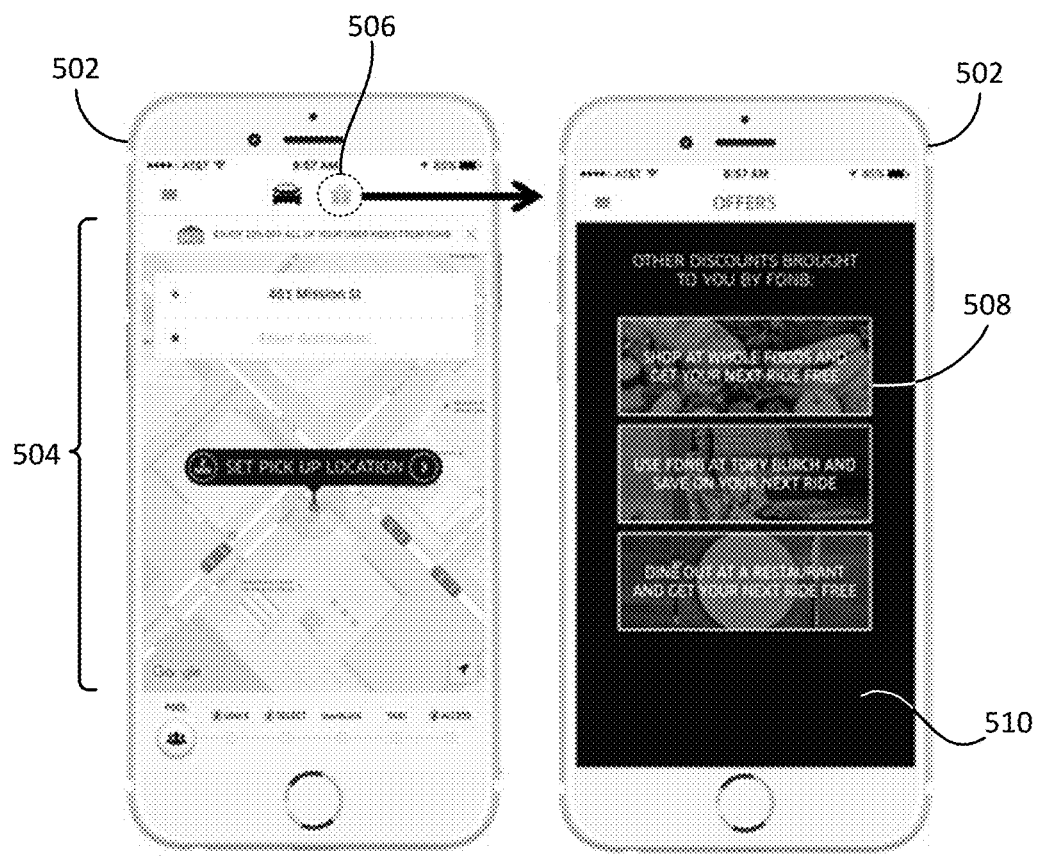
FIG. 5 depicts a second illustrative example of customized notification templates that may be presented in accordance with at least some embodiments of the disclosure.

FIG. 5 depicts a second illustrative example of customized notification templates that may be presented in accordance with at least some embodiments of the disclosure. In FIG. 5, a mobile device 502 is depicted as executing a mobile application in accordance with embodiments of the disclosure. Upon execution of the mobile application, a GUI 504 may display information relevant to the mobile application. In addition, the mobile application may cause the GUI 504 to display content associated with a number of customized notification templates as described in the disclosure.

In some embodiments, a customization notification template may include instructions that cause the mobile application to implement additional functionality. For example, a mobile application may be configured to add a populated value 506 (e.g., an icon) to the GUI 504 that, when activated, causes the mobile device to execute an action indicated in the notification template. For example, the notification template may cause an icon 506 to be added to the GUI 504 that, when activated, causes a populated value 508 (e.g., provided content) to be displayed in a populated notification template 510 via GUI 504.

Figure 6:
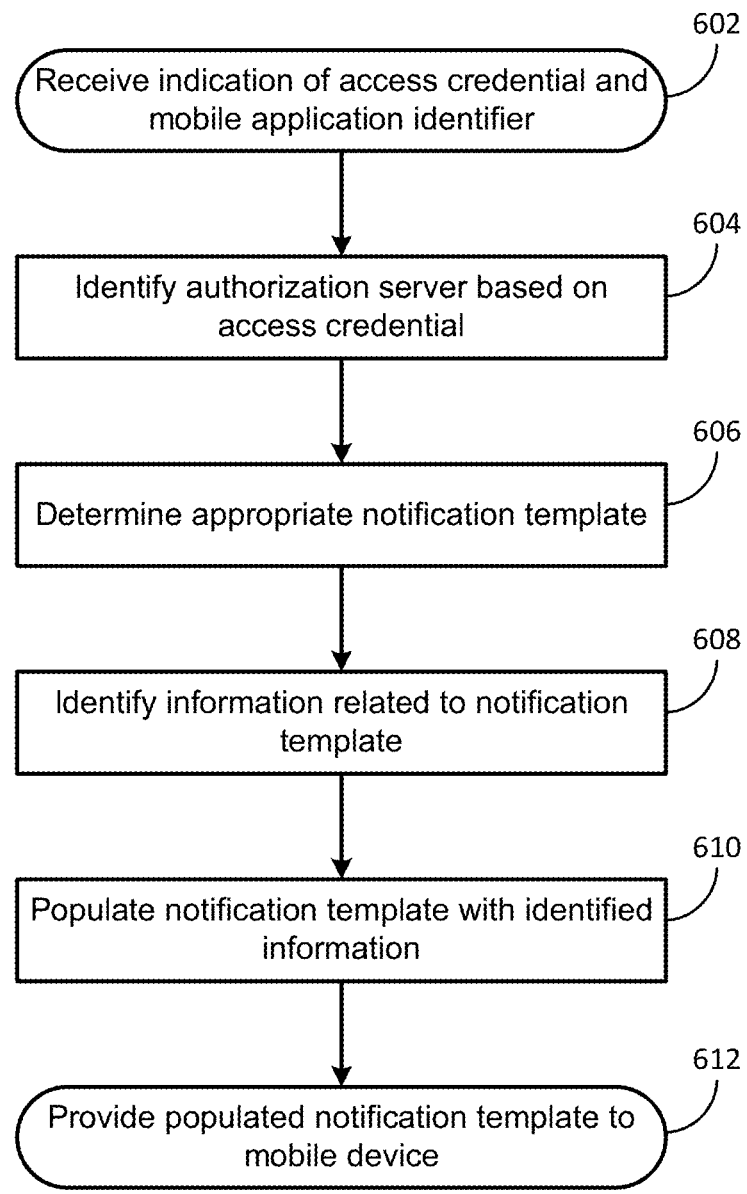
FIG. 6 depicts an example process for providing customized content to a user of a mobile application in accordance with at least some embodiments.

FIG. 6 depicts an example process for providing customized content to a user of a mobile application in accordance with at least some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the processing network depicted in FIG. 1. The code may be stored on a computer-readable storage medium, for example, in the form of a computer program including a plurality of instructions executable by one or more processors. The computer-readable storage medium may be non-transitory.

Process 600 may begin at 602, when the processing network receives an indication of a mobile application identifier and an access credential. In some embodiments, the indication may be received in the form of a request for account-specific information and/or customized content to be provided to a user of the mobile application. In some embodiments, the processing network may receive a set of notification templates to be populated from a mobile application server.

At 604, the processing network may identify an appropriate authorization server based on the received access credential. In some embodiments, the processing network may identify the authorization server based on a format of the access credential. For example, the access credential may comprise a string of characters and the appropriate authorization server may be determined based on a number of characters in the string at specific locations (e.g., the first six characters in the string). In some embodiments, an appropriate authorization server may be indicated in a request received from a mobile application server.

At 606, the processing network may identify an appropriate notification template. In some embodiments, a set of notification templates may be provided by the mobile application server. For example, a mobile application server may provide the processing network with a set of notification templates specific to a mobile application that it supports prior to implementation of embodiments, of the disclosure. In some embodiments, notification templates may be stored on an authorization server. In some embodiments, multiple notification templates may be associated with the same space within a GUI. In this scenario, it may be appropriate to select one of those multiple notification templates.

A set of notification templates may be selected based on a number of factors. For example, in some embodiments, notification templates may be selected based on a space available in a GUI of the mobile application, to include a size and/or shape of the space in which content is to be displayed. In another example, the notification template may be selected based on a status of the user with the authorization server, the processing network, and/or the mobile application server. In some embodiments, a notification template may be selected based on a time period during which content in the notification template is valid.

At 608, the processing network may identify information relevant to the notification template. In some embodiments, a notification template may include a number of data fields to be populated, each of which correspond to specific account data. In these embodiments, account details corresponding to each data field in a notification template may be identified. In some embodiments, the information relevant to the notification template may be an account status. For example, multiple potential notification templates may be identified at 606 and an account status may be used to identify which of those notification templates, if any, is most appropriate.

At 610, the processing network may populate the notification template with the identified information. For example, as described elsewhere in the disclosure, a notification template may comprise at least a portion of text and one or more data fields to be populated. In this example, the identified information may be used to populate the data fields in the notification template. At 612, the processing network may provide the populated notification template to the mobile device (e.g., via the mobile application server).

By way of illustration, consider an example in which a user enters his or her payment information into mobile application XApp in order to facilitate quick payment when using XApp on a mobile device in the future. In this example, an XApp server in communication with the mobile devce may identify a number of spaces "reserved" in its GUI for customized content. Each of the spaces may be associated with a notification template (e.g., a template indicating a size or shape of the space and/or a type of content that may be presented in the space). The notification templates may be provided to a processing network either at this time or prior to the user entering his or her payment information into the XApp mobile application. The processing network may, upon receiving the payment information (and, in some cases, the notification templates) from an XApp server, identify an issuer (or other suitable authorization server) associated with the payment information and may route a request to the identified authorization server for information to be populated into at least one of the notification templates. Once the notification template has been populated, it may be provided to the user's mobile device, where at least a portion of the populated information may be presented in the reserved space of the GUI as customized content when the XApp mobile application is executed.

In a more specific, yet non-limiting, scenario, the XApp mobile application may include two spaces in its GUI reserved for customized content. In this scenario, the first may comprise a small "banner style" space across the top of the GUI and the second may comprise a space for a new icon. In this scenario, the XApp server may identify a notification template for the banner style space that indicates a string of characters positioned along the top of the screen with a maximum character limitation of 50 characters (or a limit of one line of text). The XApp server may also identify a notification template that indicates placement of an icon and functionality to (in this illustrative case) display a popup message.

Continuing with this example, the identified notification templates may be forwarded to a processing network and/or an authorization server for further processing along with the user's payment information. Additionally, an authorization server may be provided with an identifier of the XApp server. An authorization server may determine what content, associated with both the XApp application and the user, meets the character limitation requirements for the first notification template and may subsequently populate that notification template with that content. In some embodiments, the authorization server may have stored several potential contents, from which an appropriate content may be selected based on user-specific information. By way of further illustration, the authorization server may have stored, in relation to the XApp mobile application, separate messages that state "Enjoy 8% off XApp purchases when you use your XYZ Visa," "Enjoy 10% off XApp purchases when you use your XYZ Visa," and "Enjoy 12% off XApp purchases when you use your XYZ Visa." Each of the messages may be associated with various conditions. For example, each of the messages may require that the user be in good standing with the authorization entity. In that case, if the user is not in good standing, then none of the messages may be selected. The messages may also each be associated with an account status. Provided that the user is in good standing, the authorization server may determine a status of the user's account (e.g., silver member, gold member, platinum member, etc.) and may select which of the messages is appropriate based on the identified status. Upon selecting the appropriate content, the authorization server may populate the first notification template with that content and transmit it back to the XApp server (e.g., via the processing network), which may provide the populated first notification template to the mobile device.

Upon receiving the second notification template, the authorization entity may determine that the notification template includes a data field that may be populated with content to be provided in a pop-up message and a data field that may be populated with an icon image. The authorization server may identify a number of discounts or other offers associated with the XApp mobile application that are available to the user (based on account information). The authorization server may populate the pop-up message with one or more of these offers (i.e., content selections) based on the amount of space indicated for this data field in the second notification template. In some embodiments, the authorization server may identify one or more content selections appropriate for a user based at least in part on a purchase history associated with the user. The authorization server may also populate the icon image data field with an image of its own logo to be used as the icon image. Upon populating the second notification template, the authorization server may transmit it back to the XApp server (e.g., via the processing network), which may provide the populated second notification template to the mobile device.

In this illustrative example, the XApp mobile application, when executed on the mobile device, may display the content provided in the first notification template across the top of the GUI. Additionally, the XApp mobile application may present an icon (comprising the logo of the authorization entity), that when selected by the user, presents a separate pop-up message that includes multiple offers related to the use of the XApp mobile application.

Embodiments of the disclosure provide for a number of technical advantages. For example, compared to the static method of advertising described in the Background, embodiments of the invention can create and populate templates dynamically using dynamic and/or static data. In some cases, purchasing histories or preferences located at a processing network and/or authorization server can be utilized to select templates and/or values for those templates. Also, the disclosure enables mobile application operators to offer better customization for their users, resulting in a GUI that is better suited to that user. In addition, the disclosure provides for a unique synergy between a user's selected authorization server and a mobile application that allows users to be apprised of, and take better advantage of, benefits of having a particular access credential and/or status. By embedding personalized messages into a user's mobile application experience created in substantially real time, more relevant and effective messages can be provided to the user. The disclosure reminds users of the value of rewards or other benefits (e.g., price protection, insurance, etc.) and enables better targeting of promotions to a user. For example, the authorization server is better made aware of a user's interests through the use of mobile applications. This results in greater loyalty for both the mobile application and the authorization server for users.

Additionally, the disclosure provides unconventional techniques for enabling an authorization server to provide content to a user of a mobile application in an unintrusive manner, while enabling the mobile application operator to benefit from content provided by the authorization server. The mobile application operator is able to leverage unused space within its GUI, by "renting" that space to other entities directly (e.g., without the use of an advertisement server).

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of tokens for purchase transactions, tokens can also be used to access data or other services. For example, multiple people may have tickets or other access credentials used to gain access to a location or service (e.g., a train ride or concert). In this example, the tickets for the multiple people may be aggregated under a single master token.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of providing customized content to a user of a mobile application, comprising:
   receiving, at a processing network from a mobile application server, an indication of a set of notification templates, an access credential, and an identifier for the mobile application server, wherein each notification template in the set of notification templates is associated with a space within a graphical user interface reserved by the mobile application server;
   identifying, by the processing network, an authorization computer associated with the access credential;
   identifying, by the processing network, a notification template of the received set of notification templates based at least in part on the access credential and the identifier for the mobile application server;
   requesting, by the processing network from the authorization computer, account-specific information relevant to the identified notification template, wherein the authorization computer identifies an account associated with the access credential and determines the account-specific information based on the account;
   upon receiving the account-specific information, populating, by the processing network, the notification template with the account-specific information to generate the customized content, wherein the customized content comprises a notification targeted at the user which is configured to fit within the space within the graphical user interface; and
   providing, by the processing network, the generated customized content to the mobile application server such that the customized content is presented to a user of the mobile application within the space within a graphical user interface.

2. The method of claim 1, wherein the notification template is associated with a set of conditions, and wherein the populated notification template is provided to the mobile application upon determining that each condition in the set of conditions has been met.

3. The method of claim 1, wherein the account-specific information includes a status associated with the account.

4. The method of claim 3, wherein multiple messages are identified by the authorization server and the status associated with the account is used to select a message from the multiple messages, the account-specific information comprising the selected message.

5. The method of claim 1, wherein the notification template comprises a portion of text and at least one data field.

6. The method of claim 1, wherein the mobile application server provides backend support for the mobile application executed on a mobile device.

7. A server apparatus comprising:
one or more processors; and
a memory including instructions that, when executed by the one or more processors, cause the server apparatus to:
receive, from a mobile application server, an indication of an access credential and an identifier for the mobile application server;
identify an authorization computer associated with the access credential;
identify a notification template from a set of notification templates based at least in part on the access credential and the identifier for the mobile application server, wherein each of the notification templates in the set of notification templates is associated with a space within a graphical user interface reserved by the mobile application server;
request, from the authorization computer, account-specific information relevant to the identified notification template, wherein the authorization computer identifies an account associated with the access credential and determines the account-specific information based on the account;
upon receiving the account-specific information, populate the notification template with the account-specific information to generate a customized content, wherein the customized content comprises a notification targeted at the user which is configured to fit within the space within the graphical user interface; and
provide the populated notification template to the mobile application server such that the generated customized content is presented via a mobile application in communication with the mobile application server within the space within the graphical user interface reserved by the mobile application server.

8. The server apparatus of claim 7, wherein the notification template is identified from a plurality of notification templates provided by the mobile application server.

9. The server apparatus of claim 7, wherein the notification template is identified by the authorization computer.

10. The server apparatus of claim 9, wherein the notification template is identified based at least in part on a status associated with the account.

11. The server apparatus of claim 7, wherein the access credential is a payment device.

12. The server apparatus of claim 11, wherein the authorization computer is operated by an issuer associated with the payment device.

13. The server apparatus of claim 7, wherein the populated notification template is presented in a space of a graphical user interface (GUI) associated with the notification template.

14. The server apparatus of claim 7, wherein the account-specific information includes an offer for which the account associated with the access credential is eligible.

15. A mobile application server apparatus comprising:
one or more processors; and
a memory including instructions that, when executed by the one or more processors, cause the mobile application server apparatus to:
receive, from a mobile device executing a mobile application supported by the mobile application server apparatus, an indication of an access credential to be used in at least one transaction;
identify at least one notification template of a set of available notification templates, each notification template in the set of available notification templates associated with a reserved space in a graphical user interface of the mobile application;
determine, from the at least one notification template, a number of data fields to be populated with account-specific information;
route, to an authorization server associated with the access credential, a request for the account-specific information;
upon receiving the account-specific information, populate the number of data fields of the at least one notification template to generate a customized content, wherein the customized content comprises a notification targeted at the user which is configured to fit within the space within the graphical user interface; and
provide the customized content to the mobile device, wherein the customized content is caused to be displayed within the reserved space in the graphical user interface of the mobile application.

16. The server apparatus of claim 15, wherein multiple notification templates are associated with the reserved space and the at least one notification template comprises a single notification template selected from the multiple notification templates.

17. The server apparatus of claim 15, wherein the request for the account-specific information is routed to the authorization server via a processing network.

18. The server apparatus of claim 15, wherein the request for the account-specific information includes the at least one notification template.

19. The server apparatus of claim 15, wherein the access credential is routed to the authorization server via a processing network.

20. The server apparatus of claim 15, wherein the processing network is a payment processing network that contains transaction data for transactions conducted with multiple merchants using multiple access credentials issued by multiple authorization servers.

* * * * *